(12) United States Patent
Liu

(10) Patent No.: US 11,784,802 B1
(45) Date of Patent: Oct. 10, 2023

(54) CLUSTER FEATURE CODE OBTAINMENT METHOD AND APPARATUS, AND ELECTRONIC DEVICE

(71) Applicant: INSPUR SUZHOU INTELLIGENT TECHNOLOGY CO., LTD., Jiangsu (CN)

(72) Inventor: Shuo Liu, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/023,160

(22) PCT Filed: Sep. 29, 2021

(86) PCT No.: PCT/CN2021/121891
§ 371 (c)(1),
(2) Date: Feb. 24, 2023

(87) PCT Pub. No.: WO2022/127294
PCT Pub. Date: Jun. 23, 2022

(30) Foreign Application Priority Data

Dec. 14, 2020 (CN) .......................... 202011475084.6

(51) Int. Cl.
*H04L 9/08* (2006.01)
*H04L 9/32* (2006.01)

(52) U.S. Cl.
CPC .......... *H04L 9/0825* (2013.01); *H04L 9/0866* (2013.01); *H04L 9/3242* (2013.01)

(58) Field of Classification Search
CPC .... H04L 9/0825; H04L 9/0866; H04L 9/3242
See application file for complete search history.

(56) References Cited

U.S. PATENT DOCUMENTS

2015/0169875 A1* 6/2015 Ide ........................ G06F 21/575
713/2
2018/0295115 A1* 10/2018 Kumar ................ H04L 63/0428

FOREIGN PATENT DOCUMENTS

| CN | 103067525 A | 4/2013 |
| CN | 104700002 A | 6/2015 |

(Continued)

OTHER PUBLICATIONS

C. -h. Chiu et al., "Building High-Performance and Reconfigurable Bandwidth Controllers with Adaptive Clustering," 2006 International Conference on Systems and Networks Communications, 2006, pp. 7-7; [online][retrieved on Aug. 17, 2023], Retrieved from: IEEEXplore. (Year: 2006).*

(Continued)

*Primary Examiner* — Gary S Gracia
*Assistant Examiner* — Sangseok Park
(74) *Attorney, Agent, or Firm* — IPRO, PLLC

(57) ABSTRACT

A method for obtaining a cluster feature code includes: determining a plurality of key nodes from respective nodes in a cluster; obtaining plaintexts of feature codes of the respective key nodes; according to the plaintexts of the feature codes of the respective key nodes, obtaining ciphertexts of the feature codes of the respective key nodes, by utilizing a first-level public key; calculating a check code according to the ciphertexts of the feature codes of the respective key nodes; and according to the check code, obtaining the cluster feature code, by utilizing a second-level public key. By means of the present application, the scope of influence on the entire system when system nodes change is reduced.

16 Claims, 4 Drawing Sheets

(56) References Cited

FOREIGN PATENT DOCUMENTS

| CN | 106909557 A | 6/2017 |
|---|---|---|
| CN | 107634946 A | 1/2018 |
| CN | 109510702 A | 3/2019 |
| CN | 110169008 A | 8/2019 |
| CN | 112702167 A | 4/2021 |

OTHER PUBLICATIONS

PCT/CN2021/121891 international search report.

* cited by examiner

CLUSTER FEATURE CODE OBTAINMENT METHOD AND APPARATUS, AND ELECTRONIC DEVICE

CROSS-REFERENCE TO RELATED APPLICATION

The present disclosure claims the priority of the Chinese patent application filed on Dec. 14, 2020 before the CNIPA, China National Intellectual Property Administration with the application number of 202011475084.6 and the title of "CLUSTER FEATURE CODE OBTAINMENT METHOD AND APPARATUS, AND ELECTRONIC DEVICE", which is incorporated herein in its entirety by reference.

FIELD

The disclosure relates to the technical field of computer system, in particular to a method for obtaining a cluster feature code, a device and a computer-readable storage medium thereof.

BACKGROUND

In openstack systems, large-scale deployment is often carried out. During large-scale deployment, the software will be deployed on thousands of physical machine nodes. The software needs to generate a unique usable authorization license through a feature code, and the authorization license may be used in one cluster, not other clusters, to ensure that the software is not illegally copied and abused.

SUMMARY

The disclosure aims to provide a method for obtaining a cluster feature code, a device and a computer-readable storage medium thereof.

In a first aspect, the disclosure provides a method for obtaining a cluster feature code, including:

determining a plurality of key nodes from respective nodes in a cluster;

obtaining plaintexts of feature codes of the respective key nodes;

according to the plaintexts of the feature codes of the respective key nodes, obtaining ciphertexts of the feature codes of the respective key nodes, by utilizing a first-level public key;

calculating a check code according to the ciphertexts of the feature codes of the respective key nodes; and according to the check code, obtaining the cluster feature code, by utilizing a second-level public key.

Further, the determining the plurality of key nodes from the respective nodes in the cluster includes:

calculating hash values of the respective nodes in the cluster, and forming a hash ring;

determining a number of the key nodes according to a number of the respective nodes in the cluster; and determining the plurality of key nodes on the hash ring according to the number of the key nodes.

Further, the calculating the hash values of the respective nodes in the cluster and forming the hash ring includes:

performing a modulo operation on IP addresses or MAC addresses of the respective nodes in the cluster by $2^{32}$, to obtain the hash values of the respective nodes; and combining the hash values of the respective nodes in the cluster, to form the hash ring.

Further, the determining the plurality of key nodes from the respective nodes in the cluster includes:

determining the plurality of key nodes in the cluster according to a designated command input from a user.

Further, the calculating the check code according to the ciphertexts of the feature codes of the respective key nodes includes:

combining the ciphertexts of the feature codes of the respective key nodes and node capacities of the respective key nodes, to form combined ciphertexts; and calculating the check code of the combined ciphertexts, by utilizing a digest algorithm.

Further, the digest algorithm is an SM3 algorithm.

Further, in response to that a key node is added to the cluster, the method further includes:

obtaining a plaintext of a feature code of the added key node;

according to the plaintext of the feature code of the added key node, obtaining ciphertext of the feature code of the added key node, by utilizing the first-level public key; and returning to the calculating the check code according to the ciphertexts of the feature codes of the respective key nodes.

In a second aspect, the disclosure further provides a device for obtaining a cluster feature code, including a memory and a processor, wherein a computer program being runnable on the processor is stored in the memory, and in response to that the processor executes the computer program, the processor is configured to:

to determine a plurality of key nodes from respective nodes in a cluster;

obtain plaintexts of feature codes of the respective key nodes, and according to the plaintexts of the feature codes of the respective key nodes, obtain ciphertexts of the feature codes of the respective key nodes, by utilizing a first-level public key; and calculate a check code according to the ciphertexts of the feature codes of the respective key nodes, and according to the check code, obtain the cluster feature code, by utilizing a second-level public key.

In a third aspect, the disclosure further provides an electronic device, including a memory and a processor, wherein a computer program being runnable on the processor is stored in the memory, and in response to that the processor executes the computer program, steps of the method for obtaining a cluster feature code are implemented.

In a fourth aspect, the disclosure further provides a computer-readable storage medium, wherein machine-runnable instructions are stored in the computer-readable storage medium, and in response to that the computer-runnable instructions are called and run by a processor, the computer-runnable instructions make the processor run the method for obtaining a cluster feature code.

BRIEF DESCRIPTION OF THE DRAWINGS

In order to more clearly explain technical solutions in the embodiments of the disclosure or in the prior art, the following will briefly introduce the drawings needed for illustrating the technical solutions in the embodiments of the disclosure or in the prior art. Apparently, the drawings in the following description are some embodiments of the disclosure. For those ordinary skilled in the art, they may further obtain other drawings based on these drawings without paying creative labor.

Figure 1:
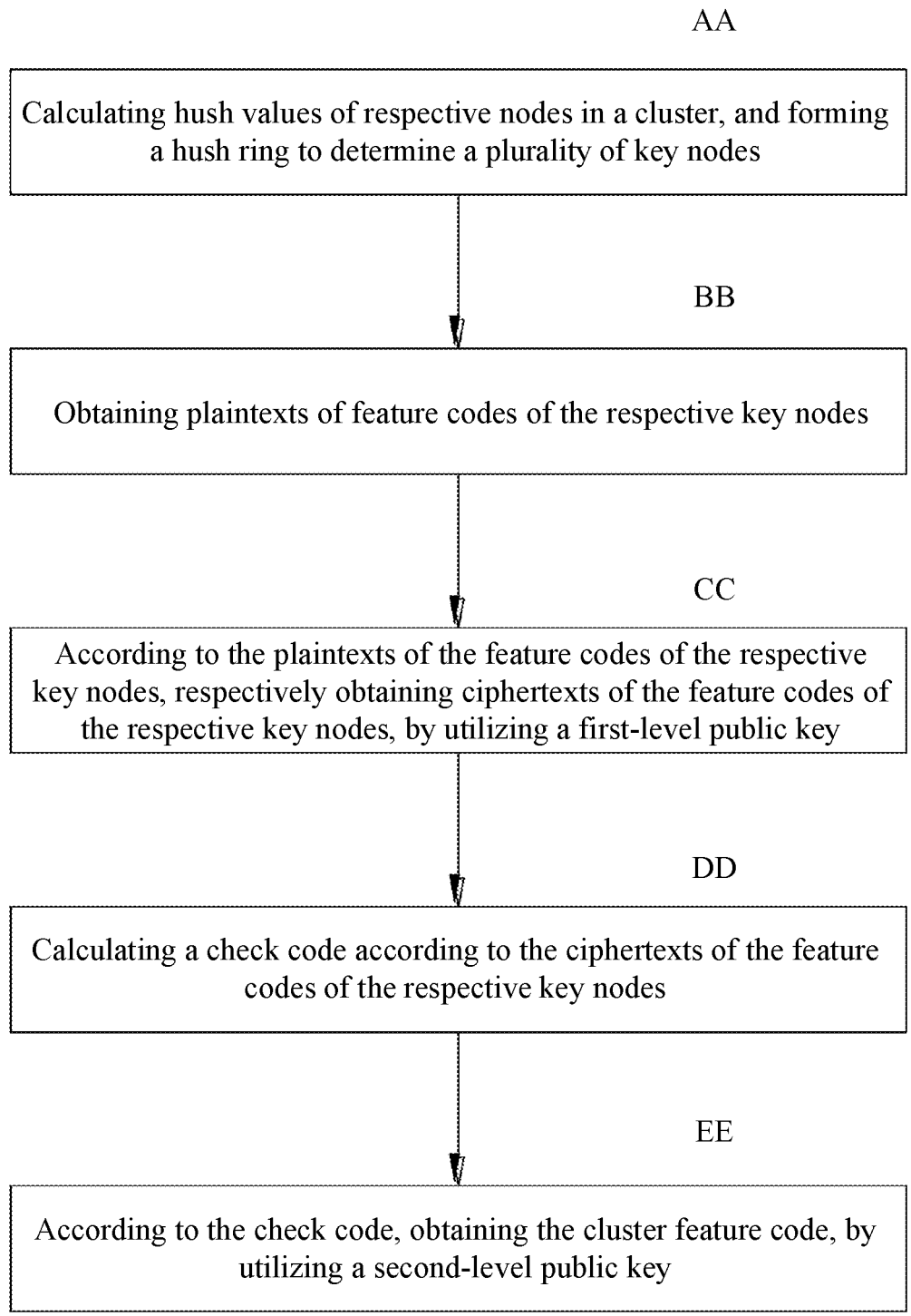
FIG. 1 is a flow chart of a method for obtaining a cluster feature code provided by an embodiment of the disclosure.

In the drawings: 800 electronic device, 801 memory, 802 processor, 803 bus, 804 communication interface.

DETAILED DESCRIPTION OF THE EMBODIMENTS

In order to make the purposes, technical solutions and advantages of the embodiments of the disclosure clearer, the technical solutions of the disclosure will be described clearly and completely below in combination with the drawings. Apparently, the described embodiments are part of the embodiments of the disclosure, not all of the embodiments of the disclosure. Based on the embodiments of the disclosure, other embodiments obtained by those ordinary skilled in the art without creative labor belong to the scope of the disclosure.

Terms "including" and "having" mentioned in the embodiments of the disclosure and any deformation thereof are intended to cover non-exclusive inclusion. For example, a process, method, system, product or device, including a series of steps or units, is not limited to the listed steps or units, but further includes other steps or units not listed, or further includes other steps or units inherent to the process, method, product or device.

A current scheme is to calculate a feature code of a cluster according to feature codes of respective machines in the cluster. A problem with this method is that there will always be storage expansion, configuration change, fault replacement, and so on, of physical nodes in a large-scale cluster. At this time, a change of feature code of a node will lead to a change of feature code of the entire cluster, which will lead to failure of authorization of software product. Another scheme is that control nodes gather feature codes of calculation nodes and generate a second-level feature code, which may solve the first problem, to reduce an influence range. However, problems in this case are that first, there are a plurality of control nodes, how the calculation nodes are classified into a control node, and if no algorithm is used, it is necessary to manually plan attribution relationships between the calculation nodes and the control nodes. Second, if a modulo algorithm is adopted, it may avoid manually planning the attribution relationships, but when a number of the control nodes changes, it will cause a huge change of the second-level feature code of a system, which will still lead to large-scale unavailability of the system.

Based on the above problems, the disclosure proposes a method for managing software effectiveness of a large-scale cluster based on consistent hashing, which reduces the influence rang on the entire system when a node in the system changes.

Referring to FIGS. 1-4, an embodiment of the disclosure provides a method for obtaining a cluster feature code, including steps of:

determining a plurality of key nodes from respective nodes in a cluster;

obtaining plaintexts of feature codes of the respective key nodes;

according to the plaintexts of the feature codes of the respective key nodes, obtaining ciphertexts of the feature codes of the respective key nodes, by utilizing a first-level public key;

calculating a check code according to the ciphertexts of the feature codes of the respective key nodes; and according to the check code, obtaining the cluster feature code, by utilizing a second-level public key.

In the disclosure, the nodes in the cluster are classified into key nodes and ordinary nodes, the key nodes and other nodes and their feature codes are managed and organized according to a consistent hashing algorithm, and a calculation method of double layers of feature codes is used, so that it is realized to improve service reliability and availability of an openstack-based cloud computing system, thereby reducing an influence rang on the entire system when a node in the system changes.

In the embodiment of the disclosure, the step of determining the plurality of key nodes from the respective nodes in the cluster includes steps of:

calculating hash values of the respective nodes in the cluster, and forming a hash ring;

determine a number of the key nodes according to a number of the respective nodes in the cluster; and determining the plurality of key nodes on the hash ring according to the number of the key nodes.

In the embodiment of the disclosure, the step of calculating the hash values of the respective nodes in the cluster and forming the hash ring includes steps of:

performing a modulo operation on Internet Protocol (IP) addresses or Media Access Control (MAC) addresses of the respective nodes in the cluster by $2^{32}$, to obtain the hash values of the respective nodes; and combining the hash values of the respective nodes in the cluster, to form the hash ring.

In the embodiment of the disclosure, the step of determining the plurality of key nodes 25 from the respective nodes in the cluster includes a step of:

determining the plurality of key nodes in the cluster according to a designated command input from a user.

In the embodiment of the disclosure, the step of calculating the check code according to the ciphertexts of the feature codes of the respective key nodes includes steps of:

combining the ciphertexts of the feature codes of the respective key nodes and node capacities of the respective key nodes, to form combined ciphertexts, the node capacities herein refer to the max authorized number, such as physical node number of machines, hardware, baremetals, etc.; and calculating the check code of the combined ciphertexts, by utilizing a digest algorithm.

In the embodiment of the disclosure, the digest algorithm is an SM3 algorithm.

In the embodiment of the disclosure, when a key node is added to the cluster, the method for obtaining a cluster feature code further includes steps of:

obtaining a plaintext of a feature code of the added key node;

according to the plaintext of the feature code of the added key node, obtaining ciphertext of the feature code of the added key node, by utilizing the first-level public key; and returning to the step of calculating the check code according to the ciphertexts of the feature codes of the respective key nodes.

An embodiment of the disclosure further provides a device for obtaining a cluster feature code, including:

a key node module, configured to determine a plurality of key nodes from respective nodes in a cluster;

a first-level calculation module, configured to obtain plaintexts of feature codes of the respective key nodes, and according to the plaintexts of the feature codes of the respective key nodes, obtain ciphertexts of the feature codes of the respective key nodes, by utilizing a first-level public key; and a second-level calculation module, configured to calculate a check code according to the ciphertexts of the feature codes of the respective key nodes, and according to the check code, obtain the cluster feature code, by utilizing a second-level public key.

An embodiment of the disclosure further provides an electronic device, including a memory and a processor, a computer program that may be run in the processor is stored in the memory, and when the processor executes the computer program, the steps of the method for obtaining a cluster feature code is realized.

An embodiment of the disclosure further provides a computer-readable storage medium, machine-runnable instructions are stored in the computer-readable storage medium, and when the computer-runnable instructions are called and run by a processor, the computer-runnable instructions make the processor run the method for obtaining a cluster feature code.

In the embodiment of the disclosure, the nodes in the cluster are classified into the key nodes and the ordinary nodes, and the key nodes and other nodes and their feature codes are managed and organized according to the consistent hashing algorithm.

Figure 2:
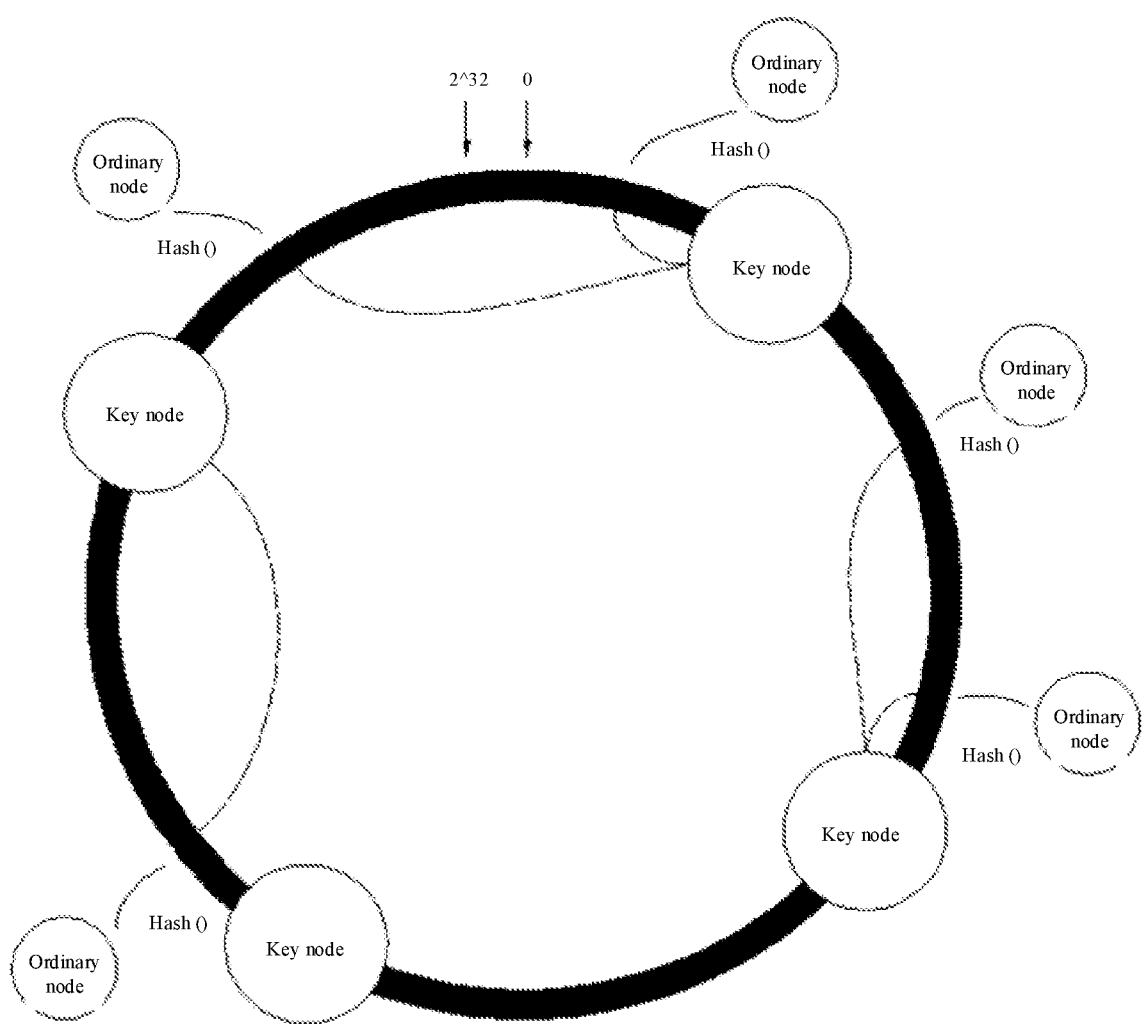
FIG. 2 is a diagram illustrating a principle for processing nodes in a cluster provided by an embodiment of the disclosure.

As shown in FIG. 2, the respective nodes in the cluster are classified into the key nodes and the ordinary nodes. When the cluster is deployed, according to certain rules (for example according to the IP addresses or MAC addresses of the nodes, and so on), that is, the modulo operation by $2/\backslash 32$, that is, the modulo operation by $2^{32}$, is performed on them, the respective nodes fall on a virtual hash ring, then the number of required key nodes are automatically calculated according to the number of the respective nodes, and the key nodes are evenly selected onto the hash ring. The key nodes may also be manually designated, and the nodes whose hardware are not changed frequently, or the nodes that do not affect a business side after changing of hardware thereof, are taken as the key nodes (for example the control nodes in an Openstack system). The business side herein refers to the actual business functions of users, such as the normal use of virtual machine, VPC network, etc..

When a key node is added to the cluster, if an ordinary modulo algorithm is used, the key nodes and the ordinary nodes will be recalculated and reattributed. However, the above design makes it unnecessary reperform a modulo operation for calculation, and original nodes do not need to be adjusted. Instead, it needs to, on the original basis, add the feature code of the 10 newly-extended key node, calculate the feature code of the added key node, and then encrypt the feature code. Before the extension is completed and a serial number is obtained, the original nodes may be used freely.

When a key node in the cluster fails, the ordinary nodes attributed to the failed key node, will be attributed to a next key node in a clockwise direction.

Figure 3:
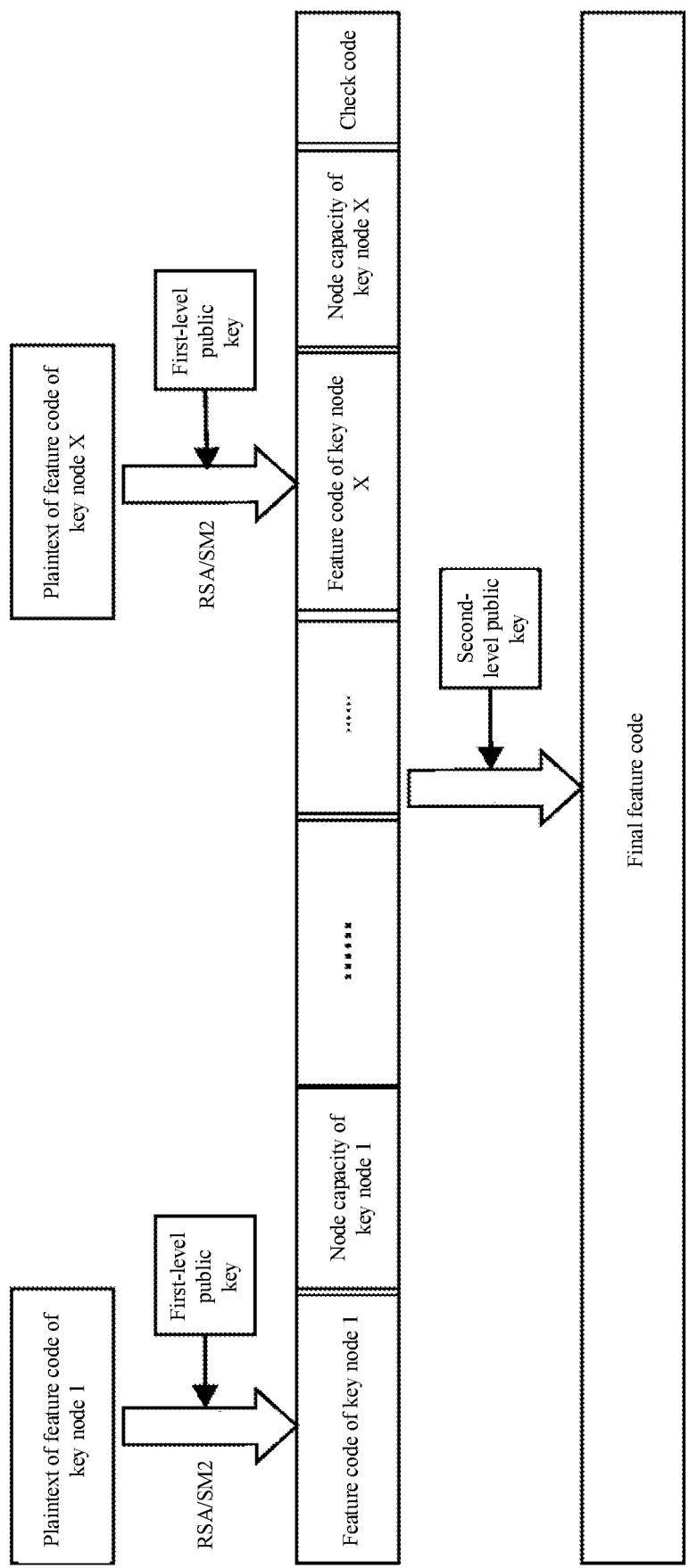
FIG. 3 is a diagram illustrating a principle for processing feature codes of key nodes provided by an embodiment of the disclosure.

In the embodiment of the disclosure, the calculation method of double layers of feature codes is as follows:

As shown in FIG. 3, the feature codes of the key nodes (which may be the IP addresses, MAC addresses, disk serial numbers, and so on) is organized into a certain format, and encrypted data is obtained by utilizing the first-level public key through an asymmetric SM2 algorithm. A plurality of encrypted feature codes of the key nodes and the node capacities of the key nodes are combined, and the check code is calculated through the SM3 digest algorithm. Then the combined data is used to obtain the final cluster feature code through the second-level public key and asymmetric encryption algorithm.

Through the calculation method of double layers of feature codes, in circumstances that configuration change or fault replacement, and so on, is required in the cluster, as long as no key node is changed, it will not lead to invalidation of cluster software authorization.

The double layers of feature codes utilize double public keys to encrypt information. When a corresponding service end verifies, double private keys are utilized to decrypt as well, so that security is further guaranteed.

In the disclosure, OpenStack is an open-source cloud computing management platform project and is a combination of a series of software open-source projects. OpenStack provides scalable and flexible cloud computing services for private and public clouds. The project aims to provide a cloud computing management platform that may be simple to implement, extendable in large scale, rich, and of unified standard.

The feature code: a machine code, refers to a series of serial numbers formed by encrypting and hashing hardware serial numbers. The feature codes obtained by different software are different, but general principles thereof are not different more. They are a group of strings obtained by reading the serial numbers of assembles for example mainboards, hard disks and so on, and then encrypting them in a certain manner. Because the encryption operation methods of different software are different, the feature codes obtained by them may be different.

Figure 4:
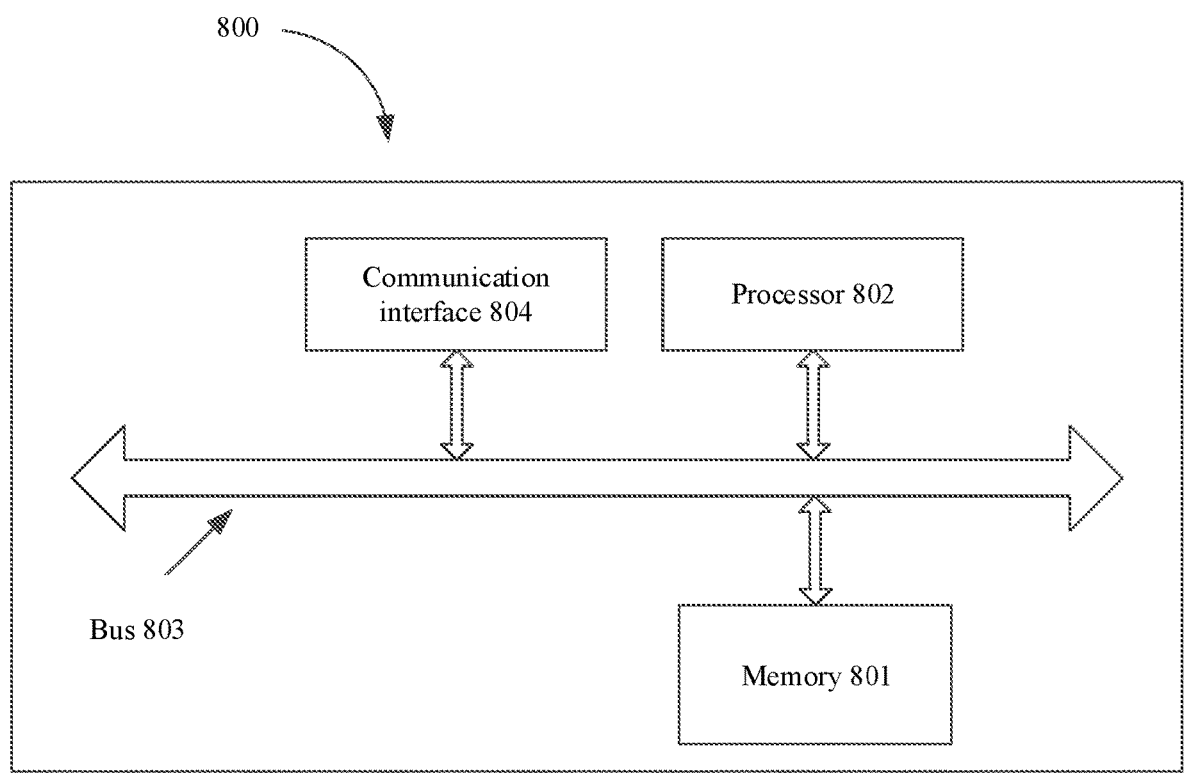
FIG. 4 is diagram illustrating a principle of an electronic device provided by an embodiment of the disclosure.

An embodiment of the disclosure further provides an electronic device, as shown in FIG. 4. The electronic device 800 includes a memory 801 and a processor 802, a computer program that may be run on the processor is stored in the memory, and when the processor executes the computer program, the steps of the methods provided by the above embodiment may be realized.

As shown in FIG. 4, the electronic device further includes: a bus 803 and a communication interface 804, the processor 802, the communication interface 804 and the memory 801 are connected through the bus 803, and the processor 802 is used to execute executable modules, for example computer programs, stored in the memory 801.

Among them, the memory 801 may include a high-speed random-access memory (RAM for short), and may further include a non-volatile memory, for example at least one disk memory. A communication connection between a network element in the system and at least one other network element is realized through at least one communication interface 804 (which may be wired or wireless), and the Internet, Wide Area Network (WAN), Local Area Network (LAN), Metropolitan Area Network (MAN), and so on, may be used.

The bus 803 may be an Industry Standard Architecture (ISA) bus, a Peripheral Component Interconnect (PCI) bus, an Extended Industry Standard Architecture (EISA) bus, and so on. The bus may be classified into address bus, data bus, control bus, and so on. For ease of representation, the bus is represented by a bidirectional arrow in FIG. 4, but it does not mean that there is one bus or one type of bus.

Among them, the memory 801 is used to store a program, and the processor 802 executes the program after receiving an execution instruction. The method executed by the device defined by processes disclosed in any of the embodiments of the disclosure may be applied to the processor 802, or implemented by the processor 802.

The processor 802 may be an integrated circuit chip with signal processing capability. In an implementation process, the respective steps of the above methods may be completed by an integrated logic circuit of hardware or instructions in a form of software in the processor 802. The above processor 802 may be a general-purpose processor, including a central processing unit (CPU), a network processor (NP), and so on. It may also be a Digital Signal Processing (DSP for short), an Application Specific Integrated Circuit (ASIC for short), a Field Programmable Gate Array (FPGA for short) or other programmable logic devices, discrete gates or transistor logic devices, discrete hardware components. The respective methods, steps and logic block diagrams disclosed in the embodiments of the disclosure may be realized or implemented. A general-purpose processor may be a microprocessor or the processor may also be any conventional processor, and so on. The steps of the methods disclosed in combination with the embodiments of the disclosure may be directly embodied in implementation or completion of a hardware decoding processor, or a combination of hardware and software modules in the decoding processor. The software modules may be located in mature storage media in the field for example, a Random Access Memory (RAM), a flash memory, a read-only memory, a programmable read-only memory or electrically erasable programmable memory, a register, and so on. The storage medium is located in the memory 801. The processor 802 reads information in the memory 801 and completes the steps of the above methods in combination with the hardware thereof The embodiment of the disclosure further provides a computer-readable storage medium corresponding to the above methods. The computer-readable storage medium stores machine-runnable instructions. When the computer-runnable instructions are called and run by the processor, the computer-runnable instructions make the processor run the steps of the above methods.

The devices provided by the embodiments of the disclosure may be hardware on the devices or software or firmware installed on the devices. Implementation principles and technical effects of the devices provided by the embodiments of the disclosure are the same as those of the above method embodiments. For a brief description, what the device embodiments are not mentioned may be referred to the corresponding contents of the above method embodiments. Those skilled in the art may clearly understand that, for convenience and simplicity of description, working processes of the systems, devices and units described above may refer to the corresponding processes in the above method embodiments, and will not be repeated here.

In several embodiments provided by the disclosure, it should be understood that the disclosed devices and methods may also be realized in other ways. The device embodiments described above are exemplary. For example, the flow charts and block diagrams in the drawings show possibly-realized architectures, functions and operations of the devices, the methods and the computer program products according to a plurality of embodiments of the disclosure. In this regard, each block in the flow charts or block diagrams may represent a module, a program segment or a part of codes, and the module, the program segment or the part of codes contains one or more executable instructions for implementing one or more specified logical function. It should also be noted that in some alternative implementations, the functions marked in the blocks may also occur in a different order from those marked in the drawings. For example, two consecutive blocks may actually be executed basically in parallel, and they may sometimes be executed in reverse order, depending on functions involved. It should also be noted that each block in the block diagrams and/or flow charts, as well as combinations of blocks in the block diagrams and/or flow charts, may be implemented by dedicated hardware-based systems that perform specified functions or actions, or may be implemented by combinations of dedicated hardware and computer instructions.

For another example, divisions of units are logical function divisions, and there may be other division methods in actual implementations. For another example, a plurality of units or components may be combined or integrated into another system, or some features may be ignored or not implemented. On the other hand, mutual coupling or direct coupling or communication connection shown or discussed may be indirect coupling or communication connection through some communication interfaces, devices or units, and may be electrical, mechanical or other forms.

The units described as separate units may or may not be physically separated, and parts displayed as units may or may not be physical units, that is, they may be located in one place or distributed to a plurality of network units. A part of or all of the units may be selected according to actual needs to achieve the purpose of the solutions of the embodiments.

In addition, the respective functional units in the embodiments provided by the disclosure may be integrated in a processing unit, or the respective units may physically separately exist, or two or more of the units may be integrated in a unit.

If functions are implemented in a form of software functional units and sold or used as separate products, they may be stored in a computer-readable storage medium. Based on such understanding, the technical solutions of the disclosure, or a contribution part to the prior art, or part of the technical solutions, may be embodied in a form of a software product. The computer software product is stored in a storage medium. The computer software product includes a number of instructions to enable a computer device (which may be a personal computer, a server, or a network device, and so on) to implement all or part of the steps of the methods of the respective embodiments of the present disclosure. The aforementioned storage media include various media that may store program codes, for example, a Universal Serial Bus (USB) flash disk, a mobile hard disk, a Read Only Memory (ROM for short), a Random Access Memory (RAM for short), a magnetic disc or an optical disc, and so on.

It should be noted that like labels and letters represent like items in following drawings. Therefore, once an item is defined in one drawing, it does not need to be further defined and explained in subsequent drawings. In addition, the terms "first", "second", "third", and so on, are used to distinguish descriptions, and shall not be understood as indicating or implying relative importance.

In the description of the disclosure, it should further be noted that, unless otherwise specified and defined, the terms "configuration", "installation", "communication" and "connection" should be understood in a broad sense, for example, it may be fixed connection, removable connection or integrated connection. It may be mechanical connection or electrical connection. It may be direct connection, or indirect connection through intermediate media. It may be internal connection between two components. For those ordinary skilled in the art, the meanings of the above terms in the disclosure may be understood according to actual circumstances.

Finally, it should be noted that the above embodiments are implementations of the disclosure, and are used for illustrating the technical solutions of the disclosure, rather than limit them. The protection scope of the disclosure is not limited thereto. Although the disclosure has been described in detail with reference to the above embodiments, those ordinary skilled in the art should understand that: any skilled person familiar with the technical field may, within the technical scope disclosed by the disclosure, modify the technical solutions recorded in the aforementioned embodiments or easily think of changes thereof, or equivalently substitute a part of the technical features therein. However, these modifications, changes or substitutions do not make an essence of the corresponding technical solutions out of the scope of the technical solutions of the embodiments of the disclosure, all of which shall be covered in the protection scope of the disclosure. Therefore, the protection scope of the disclosure shall be subject to that of the claims.

The invention claimed is:

1. A method for obtaining a cluster feature code, comprising:
   determining a plurality of key nodes from respective nodes in a cluster;
   obtaining plaintexts of feature codes of the respective key nodes;
   according to the plaintexts of the feature codes of the respective key nodes, obtaining ciphertexts of the feature codes of the respective key nodes, by utilizing a first-level public key;
   calculating a check code according to the ciphertexts of the feature codes of the respective key nodes; and
   according to the check code, obtaining the cluster feature code, by utilizing a second-level public key;
   wherein the determining the plurality of key nodes from the respective nodes in the cluster comprises:
      calculating hash values of the respective nodes in the cluster, and forming a hash ring;
      determining a number of the key nodes according to a number of the respective nodes in the cluster; and
      determining the plurality of key nodes on the hash ring according to the number of the key nodes;
   wherein the calculating the hash values of the respective nodes in the cluster and forming the hash ring comprises:
      performing a modulo operation on Internet Protocol (IP) addresses or Media Access Control (MAC) addresses of the respective nodes in the cluster by $2^{32}$, to obtain the hash values of the respective nodes; and
      combining the hash values of the respective nodes in the cluster, to form the hash ring.

2. The method for obtaining a cluster feature code according to claim 1, wherein the determining the plurality of key nodes from the respective nodes in the cluster comprises:
   determining the plurality of key nodes in the cluster according to a designated command input from a user.

3. The method for obtaining a cluster feature code according to claim 1, wherein the calculating the check code according to the ciphertexts of the feature codes of the respective key nodes comprises:
   combining the ciphertexts of the feature codes of the respective key nodes and node capacities of the respective key nodes, to form combined ciphertexts; and
   calculating the check code of the combined ciphertexts, by utilizing a digest algorithm.

4. The method for obtaining a cluster feature code according to claim 3, wherein the digest algorithm is an SM3 algorithm.

5. The method for obtaining a cluster feature code according to claim 4, wherein, in response to that a key node is added to the cluster, the method further comprises:
   obtaining a plaintext of a feature code of the added key node;
   according to the plaintext of the feature code of the added key node, obtaining ciphertext of the feature code of the added key node, by utilizing the first-level public key; and
   returning to the calculating the check code according to the ciphertexts of the feature codes of the respective key nodes.

6. The method for obtaining a cluster feature code according to claim 1, wherein the key nodes are evenly selected onto the hash ring.

7. The method for obtaining a cluster feature code according to claim 2, wherein nodes whose hardware are not changed frequently, or nodes that do not affect a business side after changing of hardware, are selected as the key nodes.

8. The method for obtaining a cluster feature code according to claim 7, wherein control nodes are selected as the key nodes.

9. The method for obtaining a cluster feature code according to claim 1, wherein, in response one of the key nodes in the cluster fails, the ordinary nodes attributed to the failed key node are attributed to a next one of the key nodes in a clockwise direction.

10. The method for obtaining a cluster feature code according to claim 1, wherein the calculating the hash values of the respective nodes in the cluster and forming the hash ring comprises:
    performing a modulo operation on disk serial numbers of the respective nodes in the cluster by $2^{32}$, to obtain the hash values of the respective nodes; and combining the hash values of the respective nodes in the cluster, to form the hash ring.

11. The method for obtaining a cluster feature code according to claim 1, wherein the obtaining the ciphertexts of the feature codes of the respective key nodes by utilizing the first-level public key according to the plaintexts of the feature codes of the respective key nodes comprises:
    obtaining the ciphertexts of the feature codes of the respective key nodes by utilizing the first-level public key through an asymmetric SM2 algorithm.

12. The method for obtaining a cluster feature code according to claim 3, wherein the digest algorithm is an asymmetric encryption algorithm.

13. A device for obtaining a cluster feature code, comprising a memory and a processor, wherein a computer program being runnable on the processor is stored in the memory, and in response to that the processor executes the computer program, the processor is configured to:
    determine a plurality of key nodes from respective nodes in a cluster;
    obtain plaintexts of feature codes of the respective key nodes, and according to the plaintexts of the feature codes of the respective key nodes, obtain ciphertexts of the feature codes of the respective key nodes, by utilizing a first-level public key; and
    calculate a check code according to the ciphertexts of the feature codes of the respective key nodes, and according to the check code, obtain the cluster feature code, by utilizing a second-level public key;

wherein the processor is further configured to:
- calculate hash values of the respective nodes in the cluster, and form a hash ring;
- determine a number of the key nodes according to a number of the respective nodes in the cluster;
- determine the plurality of key nodes on the hash ring according to the number of the key nodes:
- perform a modulo operation on IP addresses or MAC addresses of the respective nodes in the cluster by $2^{32}$, to obtain the hash values of the respective nodes; and
- combine the hash values of the respective nodes in the cluster, to form the hash ring.

14. The device for obtaining a cluster feature code according to claim 13, wherein the processor is further configured to:
determine the plurality of key nodes in the cluster according to a designated command input from a user.

15. The device for obtaining a cluster feature code according to claim 13, wherein the processor is further configured to:
- combine the ciphertexts of the feature codes of the respective key nodes and node capacities of the respective key nodes, to form combined ciphertexts; and
- calculate the check code of the combined ciphertexts, by utilizing a digest algorithm.

16. A non-transitory computer-readable storage medium, wherein machine-runnable instructions are stored in the computer-readable storage medium, and in response to that the computer-runnable instructions are called and run by a processor, the computer-runnable instructions make the processor run steps of:

- determining a plurality of key nodes from respective nodes in a cluster;
- obtaining plaintexts of feature codes of the respective key nodes;
- according to the plaintexts of the feature codes of the respective key nodes, obtaining ciphertexts of the feature codes of the respective key nodes, by utilizing a first-level public key;
- calculating a check code according to the ciphertexts of the feature codes of the respective key nodes; and
- according to the check code, obtaining the cluster feature code, by utilizing a second-level public key;

wherein the determining the plurality of key nodes from the respective nodes in the cluster comprises:
- calculating hash values of the respective nodes in the cluster, and forming a hash ring;
- determining a number of the key nodes according to a number of the respective nodes in the cluster; and
- determining the plurality of key nodes on the hash ring according to the number of the key nodes;

wherein the calculating the hash values of the respective nodes in the cluster and forming the hash ring comprises:
- performing a modulo operation on Internet Protocol (IP) addresses or Media Access Control (MAC) addresses of the respective nodes in the cluster by $2^{32}$, to obtain the hash values of the respective nodes; and
- combining the hash values of the respective nodes in the cluster, to form the hash ring.

* * * * *